United States Patent Office 3,551,527
Patented Dec. 29, 1970

3,551,527
1,4,2-DIAZAPHOSPHOLIDINE DERIVATIVES AND PROCESS FOR THEIR PREPARATION
Christian Weber, Cologne-Stammheim, and Rudolf Merten, Leverkusen, Germany, assignors to Farbenfabriken Bayer Aktiengesellschaft, Leverkusen, Germany, a corporation of Germany
No Drawing. Continuation-in-part of application Ser. No. 742,190, July 3, 1968. This application Sept. 20, 1968, Ser. No. 761,318
Claims priority, application Germany, July 7, 1967, F 52,883
Int. Cl. C07c *119/04;* C07f *9/36*
U.S. Cl. 260—927        4 Claims

ABSTRACT OF THE DISCLOSURE

The invention is concerned with new 1,4,2-diazaphospholidine derivatives useful as catalysts for the preparation of carbodiimides from isocyanates as well as with a process for the preparation of these compounds which comprises the reaction of mono- and polyisocyanates or mono- and polyisothiocyanates with α-alkylamino-alkane (thio)phosphonic acid diesters or monoisocyanates or monoisothiocyanates with bis- or tris-α-alkylamino-alkane (thio)phosphonic diesters.

---

This application is a continuation-in-part application of the copending application, entitled: 1,4,2-diazaphospholidine derivatives and process for their preparation, filed by Christian Weber and Rudolf Merten, Ser. No. 742,190, filed July 3, 1968, now abandoned.

The present invention relates to new 1,4,2-diazaphospholidine derivatives and to a process for their preparation. 1,4,2-diazaphospholidine derivatives which are substituted on a nitrogen atom of the heterocyclic ring by hydrogen have already been disclosed in German Auslegeschrift No. 1,111,196. According to this German Auslegeschrift, the 1,4,2-diazaphospholidine derivatives (phosphadiazole derivatives) are prepared by reacting halomethylthiophosphonic acid O-alkylester thiocyanates of the general formula

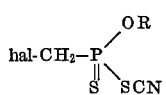

wherein R is a lower alkyl group, and hal=halogen, with ammonia, primary aliphatic or aromatic amines or hydrazine.

It has now surprisingly been found that new 1,4,2-diazaphospholidine derivatives can be obtained very simply and in high yields by either reacting mono- or polyisocyanates or mono- or polyisothiocyanates with α-alkylamino-alkane(thio)phosphonic acid diesters or by reacting monoisocyanates or monothioisocyanates with bis- or tris-α-alkyl-amino-alkane(thio)phosphonic acid diesters.

It is therefore an object of the invention to provide new 1,4,2-diazaphospholidine derivatives of the general formula:

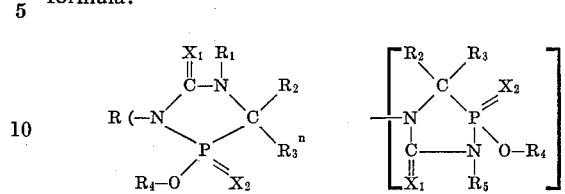

in which:

R represents an *n*-valent aliphatic, cycloaliphatic, or araliphatic radical which may be substituted and/or be olefinically unsaturated or an aromatic radical which may be substituted, $R_1$ represents a hydrogen atom or a substituted or unsubstituted, saturated or unsaturated alkyl or cycloalkyl radical or a substituted or unsubstituted aryl radical, preferably with 1 to 20 carbon atoms, $R_2$ represents a hydrogen atom or an alkyl or a cycloalkyl radical, preferably with 1 to 20 carbon atoms, $R_3$ represents a hydrogen atom or an alkyl, cycloalkyl or aryl radical, $R_2$ and $R_3$ together may represent a polymethylene radical with 4 to 6 carbon atoms, $R_4$ represents an alkyl, cycloalkyl or aryl radical, preferably with 1 to 20 carbon atoms, $R_5$ represents a monovalent, substituted or unsubstituted, saturated or unsaturated, aliphatic, cycloaliphatic or araliphatic radical or a substituted or unsubstituted aromatic radical or a substituted or unsubstituted aromatic radical, $R_6$ represents a divalent or trivalent, substituted or unsubstituted aliphatic, araliphatic or aromatic radical, preferably with 1 to 20 carbon atoms, $X_1$ and $X_2$ represent oxygen or sulphur atoms $n$ is an integer from 1 to 4 and $m$ denotes 2 or 3.

Another object of the invention is a process for the preparation of these new 1,4,2-diazaphospholidine derivatives in which mono- and polyisocyanates or mono- and polyisothiocyanates of the general formula $$R(NCX_1)_n$$

are reacted at elevated temperatures, if desired in an inert solvent and if desired in the presence of a catalyst, with α-alkylamino-alkane (thio)phosphonic acid diesters of the general formula

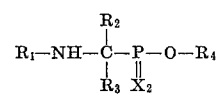

or monoisocyanates or monoisothiocyanates of the general formula

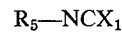

are reacted with bis- or tris-α-alkylamino-alkane (thio)-phosphonic acid diesters of the general formula

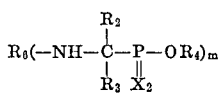

in which R, $R_1$, $R_2$, $R_3$, $R_4$, $R_5$, $R_6$, $X_1$ and $X_2$ and $n$ and $m$ having the meanings given above, the reaction being carried out in such a way that substantially one isocyanate group or isothiocyanate group enters into the reaction for each secondary amino group.

The mono- and polyisocyanates and mono- and polyisothiocyanates of the general formula $$R(NCX_1)_n$$

in which R represents a hydrogen atom or an alkyl, cycloalkyl, or arys radical, preferably with 1 to 20 carbon atoms, and $X_1$ represents oxygen or sulphur atoms and $n$ is an integer from 1 to 4 which may be used as starting materials according to the invention may be any aliphatic, cycloaliphatic, araliphatic or aromatic iso(thio)cyanates which may also be substituted or olefinically unsaturated. The following compounds are mentioned as examples: alkyl or cycloalkyl mono- and polyisocyanates such as methyl, ethyl, β-chloroethyl, propyl, 3-methoxypropyl, n-butyl, isobutyl, 6-chlorohexyl, octadecyl and cyclohexyl-isococyanates; 1,2-ethane-, 1,4-butane- and 1,6-haxane-diisocyanates; cyclohexane-1,4-diisocyanate and w,w′-diisocyanato-1,4-dimethylcyclohexane; araliphatic and aromatic mono- and polyisocyanates such as benzyl, phenyl, o-tolyl, p-chlorophenyl, p-nitrophenyl, 3,4-dichlorophenyl, pentachlorophenyl, p-bromophenyl and 1-naphthyl isocyanates; w,w′-diisocyanato-1,3-dimethylbenzene, 1,4-phenylene-diisocyanate, 1-methylbenzene-2,4- and -2,6-diisocyanate or mixtures of these isomers; isocyanates of biphenyl such as 4,4′-biphenyl-diisocyanate, triphenylmethane-4,4′,4″-triisocyanate, naphthylene-1,5-diisocyanate, and 4,4′-dimethyl-diphenylmethane-2,2′,5,5′-tetraisocyanate.

Instead of the isocyanates given above by way of example, the corresponding thioanalogues may be used. The α-alkylaminoalkane (thio)phosphoric acid diesters of the general formula

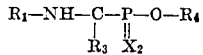

may be prepared in known manner, for example, by addition of dialkyl or diarylphosphites to Schiff's bases or by the Mannich reaction (see also H. Hellman/G. Opitz "α-aminoalkylation," publishers Chemie GmbH. Weinheim, Bergstrasse (1960), pp. 80–83).

The monoisocyanates or monoisothiocyanates of the general formula $$R_5—NCX_1$$

in which $R_5$ represents a monovalent substituted or unsubstituted saturated or unsaturated aliphatic, cycloaliphatic or araliphatic radical or substituted or unsubstituted aromatic radical, these radicals having preferably 1 to 20 crbon atoms and may be substituted for instance by halogen atoms such as chlorine or bromine, alkyl radicals with 1 to 6 carbon atoms such as methyl, butyl and hexyl radicals, nitro groups, alkoxy groups with 1 to 6 carbon atoms such as methoxy, butoxy and hexyloxy groups which may also be used according to the invention as starting compounds correspond to monoiso(thio)cyanates already defined above together with the polyiso (thio)cyanates and which are specifically exemplified. The bis- or tris-α-alkylaminoalkane(thio) - phosphonic acid diesters of the general formula

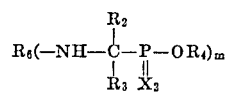

may also be prepared by methods which are known in principle, e.g. by addition of dialkyl or diaryl phosphites to compounds which have two or three azomethine groups in the molecule.

In order to carry out the process of the invention, the components are brought together in an inert organic solvent at room temperature as far as possible with the exclusion of moisture and in the presence of a catalyst, and they are cyclised by heating generally to between 35° C. and 220° C. The reaction can, however, also be carried out without solvent and without catalyst. The proportions are so chosen that the substantially isocyanate or isothiocyanate group is present for every secondary amino group.

The reaction time depends on the temperature and the components used. The reaction mixture is heated, e.g. for 2 to 5 hours under reflux, in many cases after the components have first been kept for several hours at room temperature, and the alcohol which has been split off is then removed by distillation. Any solvent present is removed under a vacuum. The products of the process are purified in the usual manner, e.g. by high vacuum distillation or crystallisation from suitable solvents.

The progress of the reaction is followed by means of the infrared spectrum. If the crude product still shows the carbonyl band for urea groups at 1610–1640 cm.$^{-1}$, heating may be continued in the high boiling solvent or if desired without solvent, in order to achieve quantitative cyclisation. Solvents which are suitable for use in the process according to the invention under the reaction conditions are those solvents which are inert to NCO groups, e.g. aliphatic, cycloaliphatic or aromatic (halogenated) hydrocarbons, esters, ethers and ketones, such as benzene, petroleum hydrocarbons, xylene, o-dichlorobenzene, nitrobenzene, methylene dichloride, dioxane, ethyl acetate and acetone; phenols such as phenol and cresol may also be used.

The process according to the invention may be carried out either with or without catalyst. Suitable catalyst are, for example, the catalysts known from isocyanate chemistry, e.g. tertiary amines such as endoethylene-piperazine ordimethyl benzylamine, phenolates, potassium hydroxide, sodium carbonate or organometallic compounds such as stannous dioctoate.

The products of the process have a molecular weight of up to 1,500. They can be used, for example, as catalysts for the preparation of carbodiimides from isocyanates. This reaction is well-known in the art. Phenyl isocyanate, tolyl isocyanate, phenylene diisocyanate, toluylene diisocyanate and other isocyanates react together at elevated temperature under evolution of carbon dioxide to produce the corresponding carbodiimides (see for instance "Agnew. Chemie, vol. 74, 1962, pp. 801 to 806"). Phospholines and phospholidines are useful catalysts for this reaction. The phospholidines produced according to the present invention are useful as catalysts for this reaction to the same extent and for the same range.

EXAMPLE 1

1-methyl-2-ethoxy-3,3-dimethyl-4-butyl-1,4,2-diazaphospholidine-5-one-2-oxide 50.2 g. (0.2 mol) of 2-butylaminopropane-2-phosphonic acid diethyl ester are heated under reflux for 5 hours with 11.4 g. (0.2 mol) of methylisocyanate and 500 mg. of 1,4-diaza[2,2,2]-bicyclooctane in 200 g. of methylene dichloride.

The methylene dichloride is distilled off under a vacuum. The reaction product is then distilled off under nitrogen. 32 g. of yellowish oil (60% of theoretical) are obtained at 143–147° C./0.4 mm. Hg.; $n_D^{20}$ 1.4710. The I.R. spectrum of the product contains a band for the carbonyl frequency at 1700–1720 cm.$^{-1}$. The structure of the compound is further confirmed by the NMR spectrum. (M=262.)

Analysis.—Calculated for $C_{11}H_{23}N_2O_3P$: C, 50.4%; H, 8.8%; N, 10.7%; P, 11.8%. Found: C, 50.4%; H, 8.9%; N, 11.1%; P, 11.9%.

EXAMPLE 2

1-methyl-2-ethoxy-3,3-dimethyl-4-butyl-1,4,2-diazaphospholidine-5-thione-2-oxide A mixture of 50.2 g. (0.2 mol) of 2-butyl-aminopropane-2-phosphonic acid diethyl ester, 400 mg. of 1,4-diaza[2,2,2]-bicyclooctane, 200 g. of xylene and 14.6 g. (0.2 mol) of methyl isothiocyanate is heated under reflux for 4 hours. 50 ml. of ethanol/xylene mixture are distilled off in a descending cooler in the course of 3 hours at normal pressure. The remaining solvent is removed under a vacuum. Yield 32 g. (58% of the theoretical), B.P. 0.3 mm. 150–159° C., $n_D^{20}$ 1.5170. (M=278.)

Analysis.—Calculated for $C_{11}H_{23}N_2O_2PS$: C, 47.5%; H, 8.4%; N, 10.1%; P, 11.2%; S, 11.5%. Found: C, 48.6%; H, 8.8%; N, 10.6%; P, 11.6%; S, 11.3%.

EXAMPLE 3

1-methyl-2-methoxy-3-p-chlorophenyl-4-methyl-1,4,2-diazaphospholidine-5-one-2-oxide 52.7 g. (0.2 mol) of methylamino-p-chlorophenyl-methanephosphonic acid dimethyl ester and 400 mg. of 1,4-diaza-[2,2,2]-bicyclooctane are suspended in 200 ml. of xylene and left to stand overnight with 11.4 g. (0.2 mol) of methyl isocyanate. The reaction mixture is then heated under reflux for 2 hours. 100 ml. of methanol/xylene mixture are then distilled off under normal pressure in an ascending cooler.

After removal of the remaining xylene by distillation under a vacuum, 35 g. of a glassy resin which crystallises when triturated with petroleum ether remain behind (60% of the theoretical). M.P. 161–163° C. (from acetone). (M=289.) I.R.: carbonyl frequencies at 1710 cm.$^{-1}$.

Analysis.—Calculated for $C_{11}H_{14}N_2O_3PCl$: C, 45.6%; H, 4.9%; N, 9.8%; P, 10.8%; Cl, 12.3%. Found: C, 45.0%; H, 5.1%; N, 9.7%; P, 10.5%; Cl, 12.0%.

EXAMPLE 4

1-phenyl-2-methoxy-3-isopropyl-4-(2-methyl)-propyl-1,4,2-diazaphospholidine-5-one-2-oxide A mixture of 47.4 g. (0.2 mol) of 1-(2-methyl)-propyl-amino-2-methylpropane-1-phosphonic acid dimethyl ester, 400 mg. of 1,4-diaza-[2,2,2]-bicyclooctane, 200 g. of xylene and 23.8 g. (0.2 mol) of phenyl isocyanate is heated under reflux for 6 hours. When the product is washed up in the same manner as in Example 1, 55 g. of crude a 1,4,2-diazaphospholidine derivative which is identified in a manner analogous to Example 1 by means of the I.R. and NMR spectrum (>CO vibrations at 1710 cm.$^{-1}$).

Analysis.—Calculated: C, 59.4%; H, 7.8%; N, 8.7%; P, 9.6%. Found: C, 60.8%; H, 8.0%; N, 8.7%; P, 6.9%.

EXAMPLE 5

Bis-(aminomethyl-phosphonic acid diethyl ester) is first prepared by the addition of diethyl phosphite to the di-Schiff's base of benzaldehyde and ethylene diamine. A solution of 51 g. (0.1 mol) of this compound in 100 ml. of o-dichlorobenzene to which 200 mg. of 1,4-diaza-[2,2,2]-bicyclooctane and 11.4 g. (0.2 mol) of methyl isocyanate are added, is heated under reflux for 4 hours and worked up as in Example 1. The product crystallises out when triturated with petroleum ether/ether. Yield 42.6 g. (80% of the theoretical), M.P. 200° (from acetone). I.R.: >CO vibration at 1725 cm.$^{-1}$. (M=534.)

Analysis.—Calculated for $C_{24}H_{32}N_4O_6P_2$: C, 53.9%; H, 6.0%; N, 10.5%; P, 11.6%. Found: C, 52.3%; H, 6.0%; N, 10.6%; P, 11.4%.

EXAMPLE 6

A reaction mixture of 167 g. (0.5 mol) of α-benzylaminophenylmethylphosphonic acid diethyl ester, 1 g. 1,4-diaza-[2,2,2]-bicyclooctane, 500 ml. of o-dichlorobenzene and 42 g. (0.25 mol) of 1,6-hexamethylenediisocyanate is left to stand overnight at room temperature. The reaction mixture is then heated to 160–170° C. for 3 hours. 30 ml. of ethanol are distilled off in a descending cooler. After removal of the solvent under a vacuum, 160 g. of the bis-(1,4,2-diazaphospholidine)-derivative remain behind. This derivative shows the characteristic band for the carbonyl vibration at 1705 cm.$^{-1}$ in the I.R. spectrum.

EXAMPLES 7 TO 24

Equimolar quantities of alkylaminoalkane phosphonic acid diesters and iso(thio)cyanates are reacted together in a manner analogous to that described in the preceding example, the reaction times chosen depending upon the type of starting compounds and varying between 2–5 hours. The reaction temperature is between 35–170° C. Purification of the products is carried out in the manner already described above. The resulting compounds of the general formula

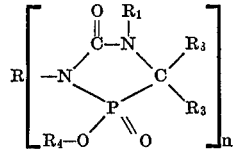

are shown in Table I whereas Table II shows the products of the general formula

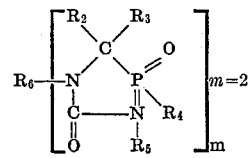

TABLE I

| No. | $R_1$ | $R_2$ | $R_3$ | $R_4$ | R | Boiling range or M.P., °C. | I.R. CO 1,700-1,720 cm.⁻¹ | Analysis Calc. | Analysis Found |
|---|---|---|---|---|---|---|---|---|---|
| 7 | $CH_3$ | H | i-$C_3H_7$ | $CH_3$ | $CH_3$ | 120–138°, 0.4–0.5 | + | C, 43.6; H, 7.8; N, 12.7; P, 14.1 | C, 43.6; H, 8.0; N, 12.7; P, 13.6 |
| 8 | $CH_3$ | H | —⟨⟩—Cl | $C_2H_5$ | $CH_3$ | Oil | + | | |
| 9 | $C_2H_5$ | $CH_3$ | $CH_3$ | $C_2H_5$ | $CH_3$ | 104–106°, 0.2 | + | C, 46.2; H, 8.2; N, 12.0; P, 13.3 | C, 46.8; H, 8.4; N, 12.5; P, 12.7 |
| 10 | $C_4H_9$ | $CH_3$ | $CH_3$ | —⟨⟩— | $CH_3$ | Oil | + | | |
| 11 | $C_4H_9$ | $CH_3$ | $CH_3$ | $C_2H_5$ | —$CH_2$—CH=$CH_2$ | 80–84°, 0.2 | + | | |
| 12 | $C_4H_9$ | H | $CH_3$ | $C_2H_5$ | $CH_3$ | 142–148°, 0.35 | + | | |
| 13 | $C_4H_9$ | H | $CH_3$ | $C_2H_5$ | —⟨⟩—Cl | Oil | + | | |
| 14 | $(CH_3)_2CH$—$CH_2$ | H | i-$C_3H_7$ | $CH_3$ | $C_3H_7$ | 140–147°, 0.4–0.5 | + | C, 53.8; H, 9.4; N, 9.6; P, 10.7 | C, 53.4; H, 9.4; N, 9.7; P, 10.4 |
| 15 | Same as above | H | i-$C_3H_7$ | $CH_3$ | $CH_3$ | 122–126°, 0.1 | + | C, 50.4; H, 8.8; N, 10.7; P, 11.7 | C, 49.4; H, 8.9; N, 10.2; P, 10.9 |
| 16 | do | H | i-$C_3H_7$ | $CH_3$ | —H | Oil | + | | |
| 17 | do | H | i-$C_3H_7$ | $CH_3$ | —⟨⟩—$CH_3$ | Oil | + | | |
| 18 | $CH_2$=CH—$CH_2$ | $CH_3$ | $CH_3$ | $C_2H_5$ | $CH_3$ | 120–130°, 0.2 | + | | |
| 19 | ⟨⟩—$CH_2$— | H H | —⟨⟩— | $C_2H_5$ | $CH_3$ | Oil | + | | |
| 20 | Same as above | H | Same | $C_2H_5$ | —⟨⟩— | Oil | + | | |
| 21 | do | H | do | $C_2H_5$ | —⟨⟩— | Resin | + | | |
| 22 | do | H | do | $C_2H_5$ | (¹) | do | + | | |

¹ —⟨⟩—$CH_2$—⟨⟩—

TABLE II

| No. | $R_2$ | $R_3$ | $R_4$ | $R_5$ | $R_6$ | Nature | I.R. CO 1,700-1,720 cm.⁻¹ |
|---|---|---|---|---|---|---|---|
| 23 | H | —⟨⟩— | $C_2H_5$ | $CH_3$ | —($CH_2$)$_6$— | Resin | + |
| 24 | H | —⟨⟩— | $C_2H_5$ | —⟨⟩— | —($CH_2$)$_6$— | do | + |

EXAMPLE 25

100 g. of phenyl isocyanate are mixed with 2 g. of 1-methyl - 2 - ethoxy-3,3-dimethyl-4-butyl-1,4,2-diazaphospholidine-5-one-2-oxide. The mixture is boiled under reflux at 150° C., temperature increases up to 200° C. within 12 to 15 hours under evolution of carbondioxide. Within this period the NCO-content of the reaction mixture runs down to zero. Reaction product is a yellow liquid which is ditsilled to give diphenylcarbodiimide in a yield of 86%.

Boiling point 122°/1 mm. Hg; $n_D^{20}$ 1.6399.

What is claimed is:
1. Compounds of the formula:

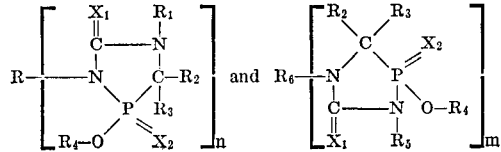

wherein:
R stands for alkyl having 1 to 20 carbon atoms, chloro substituted alkyl having 1 to 20 carbon atoms, cyclohexyl, benzyl, alkylene having up to 6 carbon atoms, cyclohexylene, dimethylene cyclohexane, methoxy substituted alkyl having 1 to 20 carbon atoms, phenyl, methylphenyl, chlorophenyl, nitrophenyl, bromophennaphthyl, dimethylenebenzene, phenylene, biphenylene, triphenylene methane, naphthylene, or the radical obtained by removing the isocyanate groups from 4,4'-dimethyl-diphenylmethane-2,2',5,5'-tetraisocyanate, $R_1$ stands for alkyl having 1 to 20 carbon atoms or benzyl,
$R_2$ stands for alkyl having 1 to 20 carbon atoms or hydrogen,
$R_3$ stands for alkyl having up to three carbon atoms, chlorophenyl or phenyl,
$R_4$ stands for alkyl having 1 to 20 carbon atoms or phenyl,
$R_5$ stands for alkyl having up to 20 carbon atoms, cycloalkyl having up to 20 carbon atoms, naphthyl, benyl, phenyl or substituted products thereof wherein the substituents are halogen, alkyl having 1 to 6 carbon atoms, nitro or alkoxy having 1 to 6 carbons, $R_6$ stands for a divalent or trivalent aliphatic radical having 1 to 20 carbon atoms, $X_1$ stands for oxygen or sulfur, $X_2$ stands for oxygen, $n$ stands for an integer of 1 to 4, and $m$ stands for 2 or 3.

2. Compounds according to claim 1 wherein R is alkyl having up to 3 carbon atoms, phenyl, methylphenyl, chlorophenyl, phenylene or diphenyl methans, $R_1$ is alkyl having up to 4 carbon atoms or benzyl, $R_2$ is hydrogen or methyl, $R_3$ is alkyl having up to 3 carbon atoms, phenyl or chlorophenyl, $R_4$ is methyl, ethyl or phenyl, $R_5$ is methyl or phenyl, $R_6$ is hexamethylene, $n$ is 1 to 2 and $m$ is 2.

3. A process for the preparation of compounds according to claim 1, comprising reacting compounds of the formula

$$R(NCX_1)_n$$

with compounds of the formula

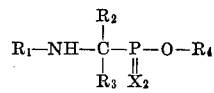

or reacting compounds of the formula

$$R_5-NCX_1$$

with compounds of the formula

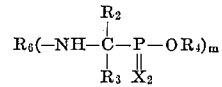

at temperatures between 35 and 220° C., wherein substantially one isocyanate or isothiocyanate group enters into the reaction for every secondary amino group.

4. A process according to claim 3 wherein R is alkyl having up to 3 carbon atoms, phenyl, methylphenyl, chlorophenyl, phenylene or diphenyl methane, $R_1$ is alkyl having up to 4 carbon atoms or benzyl, $R_2$ is hydrogen or methyl, $R_3$ is alkyl having up to 3 carbon atoms, phenyl or chlorophenyl, $R_4$ is methyl, ethyl or phenyl, $R_5$ is methyl or phenyl, $R_6$ is hexamethylene, $n$ is 1 to 2 and $m$ is 2.

References Cited

FOREIGN PATENTS 1,111,196  7/1961  Germany _____ 260—936

CHARLES B. PARKER, Primary Examiner

R. L. RAYMOND, Assistant Examiner

U.S. Cl. X.R.

252—426; 260—2, 77.5, 453, 566, 932, 936, 944, 968

PO-1050
(5/69)

UNITED STATES PATENT OFFICE
CERTIFICATE OF CORRECTION

Patent No. 3,551,527                     Dated December 29, 1970

Inventor(s) Christian Weber and Rudolf Merten

It is certified that error appears in the above-identified patent and that said Letters Patent are hereby corrected as shown below:

Col. 2, lines 5-15, the formulae should read as follows:

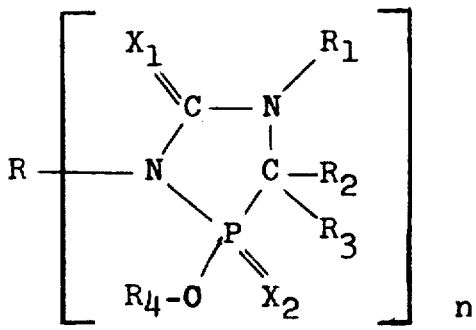 and 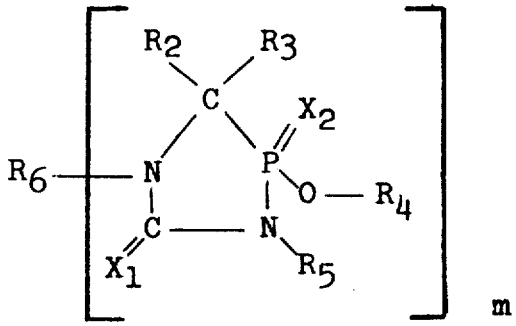

Col. 2, lines 53-68, the formula should read as follows:

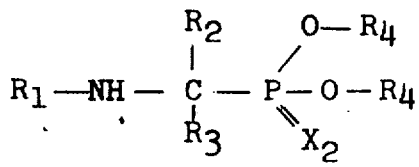

Col. 3, lines 3-11, the formula should read as follows:

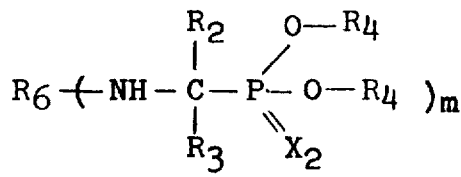

Col. 3, line 33 "haxane" should read -- hexane --.

PO-1050
(5/69)

UNITED STATES PATENT OFFICE
CERTIFICATE OF CORRECTION - page

Patent No. 3,551,527      Dated December 29, 1970

Inventor(s) Christian Weber and Rudolf Merten

It is certified that error appears in the above-identified patent and that said Letters Patent are hereby corrected as shown below:

Col. 3, lines 48-56, the formula should read as follows:

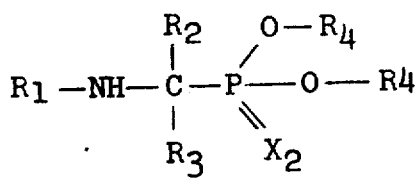

Col. 3, line 71, "crbon" should read -- carbon --.

Col. 4, lines 7-17, the formula should read as follows:

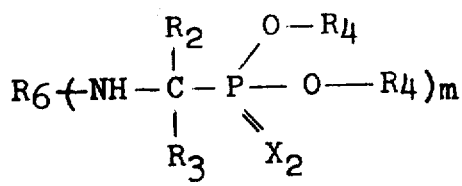

Col. 4, line 59 "ordimethyl" should read -- or dimethyl --.

Col. 4, line 69 "Agnew." should read -- Angew. --.

Col. 6, lines 65-75, the formula should read as follows:

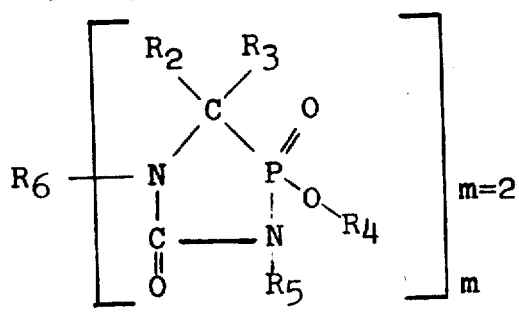

UNITED STATES PATENT OFFICE
CERTIFICATE OF CORRECTION

Patent No. 3,551,527                Dated December 29, 1970

Inventor(s) Christian Weber and Rudolf Merten

It is certified that error appears in the above-identified patent and that said Letters Patent are hereby corrected as shown below:

Col. 7, line 64 "ditsilled" should read -- distilled --.

Col. 8, line 74 "benyl" should read -- benzyl --.

Col. 9, lines 20-25, the formula should read:

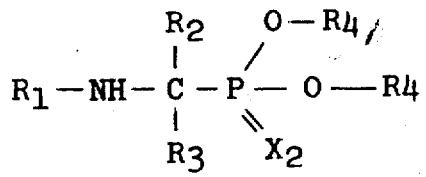

Col. 10, lines 2-5, the formula should read:

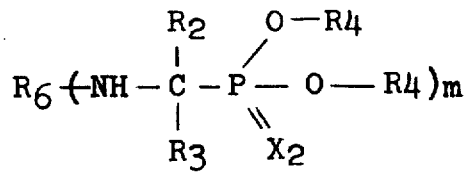

Signed and sealed this 24th day of August 1971.

(SEAL)
Attest:

EDWARD M. FLETCHER, JR.
Attesting Officer

WILLIAM E. SCHUYLER, JR.
Commissioner of Patents